United States Patent [19]
Sandford

[11] Patent Number: 6,006,924
[45] Date of Patent: *Dec. 28, 1999

[54] MULTI-MEDIA FILTRATION SYSTEM WITH REUSABLE AND DEMOUNTABLE FILTER CARTRIDGE

[75] Inventor: Michael S. Sandford, Oxnard, Calif.

[73] Assignee: PTI Technologies, Inc., Newbury Park, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/855,271

[22] Filed: May 14, 1997

[51] Int. Cl.⁶ .................................................. B01D 35/34
[52] U.S. Cl. ......................... 210/440; 210/441; 210/450; 210/457; 210/DIG. 17
[58] Field of Search ..................... 210/130, 440, 210/441, 443, 444, 450, 457, 493.2, DIG. 17

[56] References Cited

U.S. PATENT DOCUMENTS

| | | | |
|---|---|---|---|
| 3,333,703 | 8/1967 | Scavuzzo et al. | 210/DIG. 17 |
| 4,138,234 | 2/1979 | Kubesa . | |
| 4,218,324 | 8/1980 | Hartman et al. . | |
| 5,207,898 | 5/1993 | Hodgkins . | |
| 5,300,223 | 4/1994 | Wright . | |
| 5,342,519 | 8/1994 | Friedmann . | |
| 5,453,195 | 9/1995 | Jorgenson et al. . | |
| 5,538,626 | 7/1996 | Baumann | 210/130 |
| 5,584,987 | 12/1996 | Mules | 210/440 |
| 5,605,625 | 2/1997 | Mills | 210/450 |
| 5,643,448 | 7/1997 | Martin et al. | 210/443 |

FOREIGN PATENT DOCUMENTS

| | | |
|---|---|---|
| 973814 | 9/1975 | Canada . |
| 2153737 | 1/1996 | Canada . |
| 0718021A2 | 6/1996 | European Pat. Off. . |
| 4036191 | 2/1992 | Germany . |
| 3-154606 | 7/1991 | Japan . |
| 5096107 | 4/1993 | Japan . |
| 982466 | 2/1965 | United Kingdom ................... 210/130 |
| 1362715 | 8/1974 | United Kingdom . |
| WO96/09875 | 4/1996 | United Kingdom . |
| WO 93/14858 | 8/1993 | WIPO . |

OTHER PUBLICATIONS

Research Disclosure—Jun. 1988 Spin–On Assembly.
Lipp, Halogenated Solvent Induced Corrosion in Hydraulic Systems, Lubrication Engineering, Feb. 1979, Abstract only.
Conley, et al., Army Experience With Silicone Brake Fluids, Jun. 5–9, 1978, Abstract Only.
Multi Life Filter Co., Reusable Spin–On Filter Housing CHS–511, Feb. 1, 1996.
Purdy, Recycling MILH–46170 Hydraulic Fluid to Extend Fluid Service Life (Final rept. OCt. 1, 1993).

*Primary Examiner*—Matthew O. Savage
*Attorney, Agent, or Firm*—Pillsbury Madison & Sutro LLP; Intellectual Property Group

[57] ABSTRACT

A spin-on filter unit for filtering liquids which may be readily disassembled and which utilizes a perforated center tube support disposed within a housing canister having both an open end and a closed end, a mounting head assembly which includes a bayonet connector mechanism adapted for releasable engagement with the open end of the housing canister, and a spring mechanism mechanism which acts upon the center support tube to urge the mounting head assembly bayonet connection mechanism into releasable engagement with the open end of the housing canister after rotation of the mounting head assembly about its center axis relative to the housing canister.

20 Claims, 2 Drawing Sheets

MULTI-MEDIA FILTRATION SYSTEM WITH REUSABLE AND DEMOUNTABLE FILTER CARTRIDGE

FIELD OF INVENTION

This invention relates to a filtration system capable of using a wide-variety of filter elements ("multi-media"), and in particular, to a spin-on cartridge with a demountable and replaceable filter element capable of fine and coarse filtration.

BACKGROUND OF THE INVENTION

Disposable filtration cartridges for filtering fluids, such as engine oil, are well known in the art. Most of these filter cartridges utilize the well-known "spin-on, spin-off" connection construction. With these known constructions, however, the filter cartridge is permanently sealed in its housing and the entire filter including the housing, must be discarded and replaced after use because such a procedure is costly and wasteful and poses an environmental problem due to the difficulty associated with disposing of the spent filter cartridge.

To reduce the costs associated with replacing both the filter element and the support housing, and to minimize the environmental impact associated with that disposal, filters with removable filters have been developed. One such filter is disclosed in U.S. Pat. No. 4,128,324. In that patent, a tubular metal support member is used in conjunction with the filter element to facilitate disassembly and replacement of component parts within large industrial filters. But the construction disclosed in U.S. Pat. No. 4,128,324 is directed to large, high-cost industrial filters and fails to address the requirements of the lower-cost "spin-on, spin-off" construction and is therefor entirely silent with respect to how the filter cartridge and associated support are connected to, and supported by, the outer housing to facilitate ease of disassembly.

Other inventors have addressed the issue of how to easily remove a filter cartridge from the filter housing. In the system disclosed in published application WO96/09875, a spring-assist mechanism is used as part of the locking assembly which secures the filter within the housing but also provides for the disassembly from and the removal of, the cartridge from its canister housing. In that application, an annular filter is coupled with a closure plate upon which a spring element exerts an axial pressure in order to secure the filter in place within the canister.

Although the design disclosed in WO96/09875 utilizes stiffening support rings attached along the axis of the filter to support the pleated filter element, these rings do not support the filter against the axial force exerted by the spring or the local fluid pressures caused by the inward or outward flow of the liquid being filtered. This lack of such support is critical when delicate filter media is employed because the dangers of buckling, collapsing, or blow-through is much greater with this type of material. Ultimately, and owing to these dangers, the usefulness of the filter apparatus disclosed in WO96/09875 is questionable in many applications, involving the separation of fine particles.

Accordingly, one object of the present invention is to provide a multi-media filtration system which utilizes a standard "spin-on, spin-off" design, and which is capable of separating the finest of particles, including particles at the micron and sub-micron level, yet provides the convenience of a reusable and remountable filter system adaptable to a filter head or block in which all of the components may be reused except for any disposable filter element.

Another object of the present invention is to provide a spin-on filter assembly that incorporates a reusable center tube support which serves to position the filter element within the filter housing and to support the filter media against the hydraulic pressures being asserted by the fluid being filtered so as to minimize buckling, collapse, or blow-through and to isolate the filter media from other internal forces.

Related objects and advantages of the present invention will also be apparent from review of the following description and appended claims.

SUMMARY OF THE INVENTION

A spin-on filter element for filtering liquids which may be readily disassembled and which includes a perforated center tube support which is liquid-tightly connected at one end to a mounting head assembly and is closed at its other end; a housing canister having one open end and a closed second end; a tubular filter element adapted to fit within the housing canister and adapted to slip over the perforated center tube support in close proximity thereto but with no physical retention means between the tubular filter element and the center-tube support; means for forming a releasable seal between the tubular filter element and the center-tube support; the mounting head assembly further includes an annular base provided with a threaded fitting whereby it can be attached to a fluid supply and whereby unfiltered fluid can flow into the housing canister and filtered fluid can flow out of the housing canister, the mounting head assembly further includes a bayonet connection means adapted for releasable engagement with the open end of the housing canister; and a spring means adapted to urge the mounting head assembly bayonet connection means into releasable engagement with the open end of the housing canister after rotation of the mounting head assembly about its center axis relative to the housing canister.

DETAILED DESCRIPTION OF THE PREFERRED EMBODIMENT

Figure 1A:
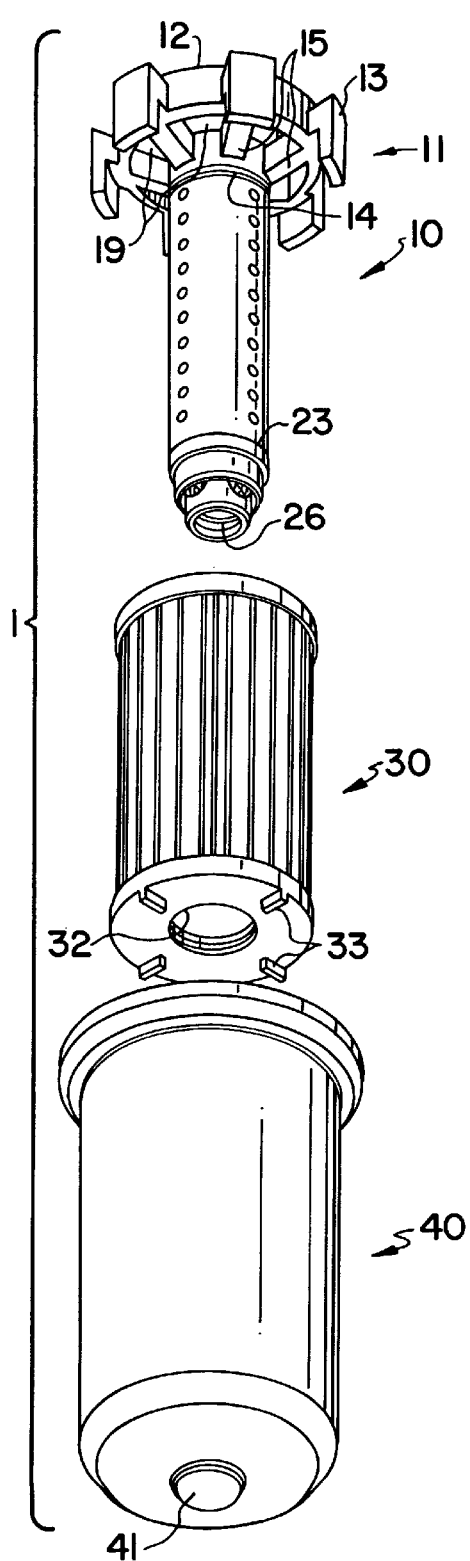
FIGS. 1A and 1B are exploded perspective views of a filter cartridge including the housing canister, a filter, and a mounting head assembly, according to the present invention.

Referring now to the drawings and particularly to FIG. 1A, there is illustrated a preferred embodiment of the filter cartridge 1 which is comprised of a mounting head assembly 10, filter cartridge 30, and housing canister 40 of the present invention. The mounting head assembly 10 is comprised of a head unit 11 and an attached center tube 21. The head unit 11 has a annular base 12 with equally spaced angled protrusions 13 attached radially along the annular base 12.

Figure 2:
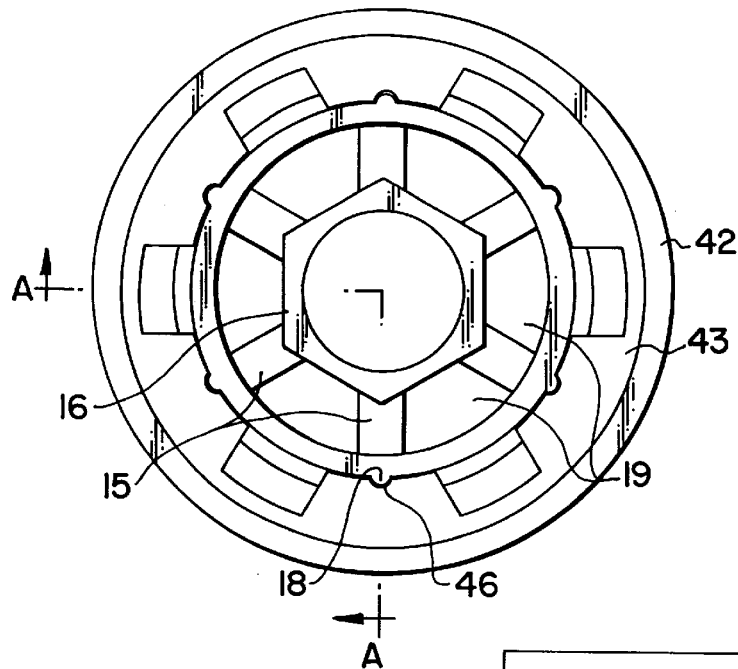
FIG. 2 is a top view of the assembled filter cartridge.

The underside of the head unit 11 defines an attaching plate 15 which is designed in a spoke-like manner to define fluid flow apertures 19 to facilitate fluid flow there through. The apertures 19 defined in the attaching plate 15 are best illustrated in FIG. 2.

The head unit 11 also includes hexagonal cap 16 (or other similar design such as would fix a conventional socket) to permit easy grip of the head unit so as to provide for ease of assembly and disassembly. This construction also minimizes accidental contact with the fluids being filtered when the filter is being opening 17 is provided at the center of the hexagonal cap 16 to permit fluid flow through the cap 16 to the center tube 21. In the typical spin-on bayonet construction, the opening 17 is threaded to permit ready connection. A plurality of apertures 19 are defined between the spokes formed in the attaching plate 15 to permit fluid flow there through. The apertures 19 defined in the attaching plate 15 are best illustrated in FIG. 2.

Figure 1B:
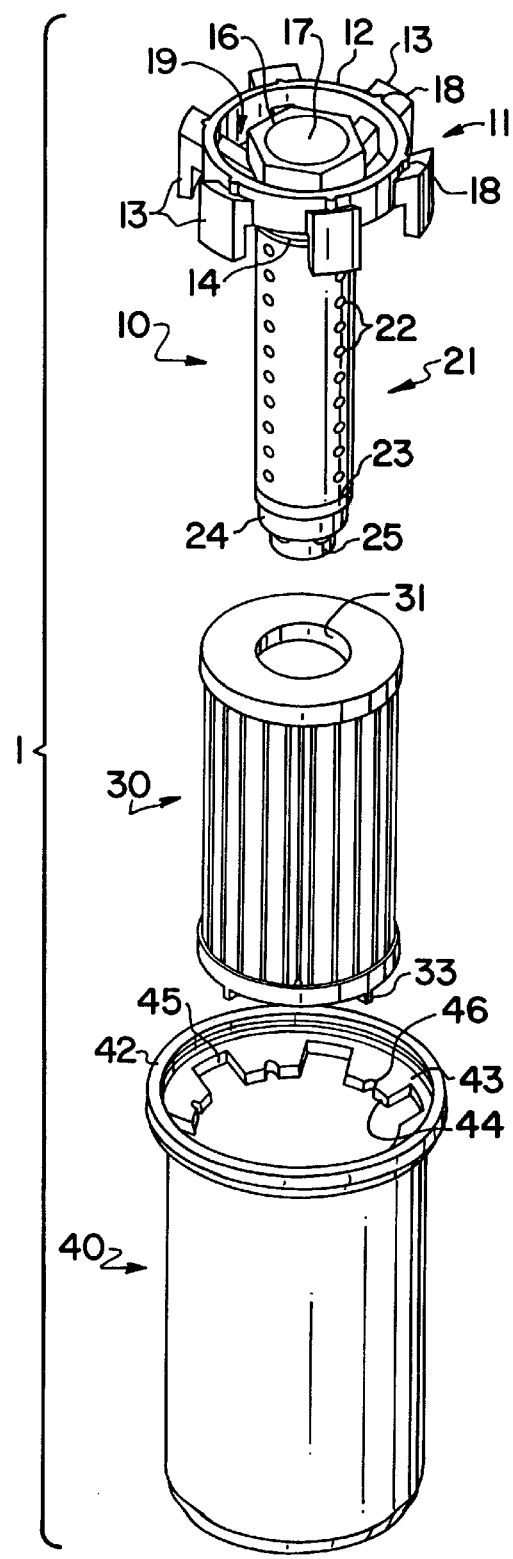

The center tube 21 includes a series of perforated flow passages 22 which will vary in size and placement depending on each specific filtration application but which are illustrated in FIGS. 1A and 1B as being placed in-line, axially along the tube 21. The top of tube 21 is fixedly attached to the bottom of the head unit 11 to create a leak-proof seal. An O-ring 14 is inserted between the bottom end of the head unit 11 and the center tube 21 to create an effective leak-proof seal with the inner surface 31 of the filter element 30 when the filter is assembled. In the preferred embodiment, the O-ring is diposed within the the endcaps 31, 32 of the filter element itself, but these O-rings may be applied directly to the center tube 21.

Moreover, the O-ring 14 may, as an alternative construction, be positioned between the top of tube 21 and the inner surface 31 of the filter element to create a liquid-tight seal. The bottom end of center tube 21 is also equipped with an O-ring 23 which serves to create a seal between the lower end of the filter element 30 and the center tube 21 at the inner surface.

In the preferred embodiment, the center tube 21 tapers in a step-like fashion to form a concentric step 24. A spring assembly is permanently mounted to a concentric tube 25 which is in turn attached to the center tube 21 just below the concentric step 24 so as to be integral with the bottom end of the center tube 21. It is important to note that the concentric tube 25 is designed to retract into the center tube 21 as the center tube 21 is inserted into the housing canister 40 whereby the coil spring 26 is compressed against a recessed base plate 41 in the housing canister 40. The spring assembly can also be comprised of a typical compression spring or any other spring design (bellows, sheat metal, etc.) The O-ring 23 is located just above a concentric step 24 on center tube 21 (whether that O-ring is affixed to the filter element end cap 32 or the center tube 21) and the spring 26 fits onto the recessed base plate 41 at the bottom of the annular housing canister 40.

The concentric tube 25 may also include flow passages (not shown) to provide flow to an optional by-pass valve (not shown) which is commonly employed in such filter assemblies. This so-called "by-pass" valve would allow fluid flow to by-pass the filter element whenever a pre-set pressure differential has been reached. If installed, it would be preferred to place the by-pass valve within the mounting head assembly 10. It is also possible to equip the present invention with an anti-drain valve (not shown) in current wide-spread use. The center tube 21 may also incorporate permanent magnets (not shown) to assist the filter element 30 in capturing metal particles.

The filter element 30 is provided with an annular opening at the bottom end cap 32 and at the top end cap 31 through which the liquid being filtered can flow. In use, the filter element 30 slips over the center tube 21 which acts a support core to the filter element 30. The base of the filter element 30 may have fingers 33 which create a flow path for by-pass fluid flow and assist in holding the filter element 30 in place inside the housing canister 40. As a direct result of this construction, the filter element 30 is correctly positioned and retained within the housing canister 40, but the filter element 30 has no axially pressure exerted on it.

Although the top interior rim 42 of the housing canister 40 can be threaded for attachment to a filter head or block (not shown), the more common attachment mechanism is to thread the opening 17 for a spin-on, spin-off connection to the filter head or engine block (not shown). A top plate 43 is made up of flanges 44 and cut-outs 45 which are equally spaced apart. This top plate 43, which can utilize a ribbed construction for greater strength, is sealed onto the interior of the housing canister 40 via a gasket retainer (not shown) to which the top plate 43 is fixed by low cost canning technologies, but which may also utilize welding as an option to provide aditional strength.

In use, the flanges 44 and cut-outs 45 formed on the top plate 43 correspond with spacing, size and geometry the protrusions 13 formed on the head unit 11. The protrusions 13 act as guides to center the head unit 11 within the housing canister 40 so as to minimize any inadvertent cocking during assembly and disassembly. The protrusions 13 are constructed and spaced to latch underneath the flanges 44 once the axial ribs, 18 formed on the head unit 11 align with the indents, or axial slots, 46 formed in the top plate 43. Each of the flanges 44 have an indent 46 which aligns with equally spaced axial ribs 18 attached circumferentially on the annular base 12 to promote a secure fit of the mounting head assembly 10 and filter element 30. These notches and indents also provide a visual indication of correct assembly and may be color coded to enhance this isual indication.

Referring to FIG. 2, there is illustrated the top view of the assembled invention. The outermost annular ring 42 is top rim of the housing canister 40. The annular ring 42 can be provided with an O-ring or so-called "base gasket" (not shown) to create a liquid-tight seal between the housing canister 40 and the engine block (not shown) or any other filter head which serves as a fluid source. Concentric to the ring 42 is a view of the top plate 43 and attached mounting head assembly 11. This view also well illustrates the indents 46 and notches 18 in an aligned and engaged position and the spokes at the attaching plate 15.

Figure 3:
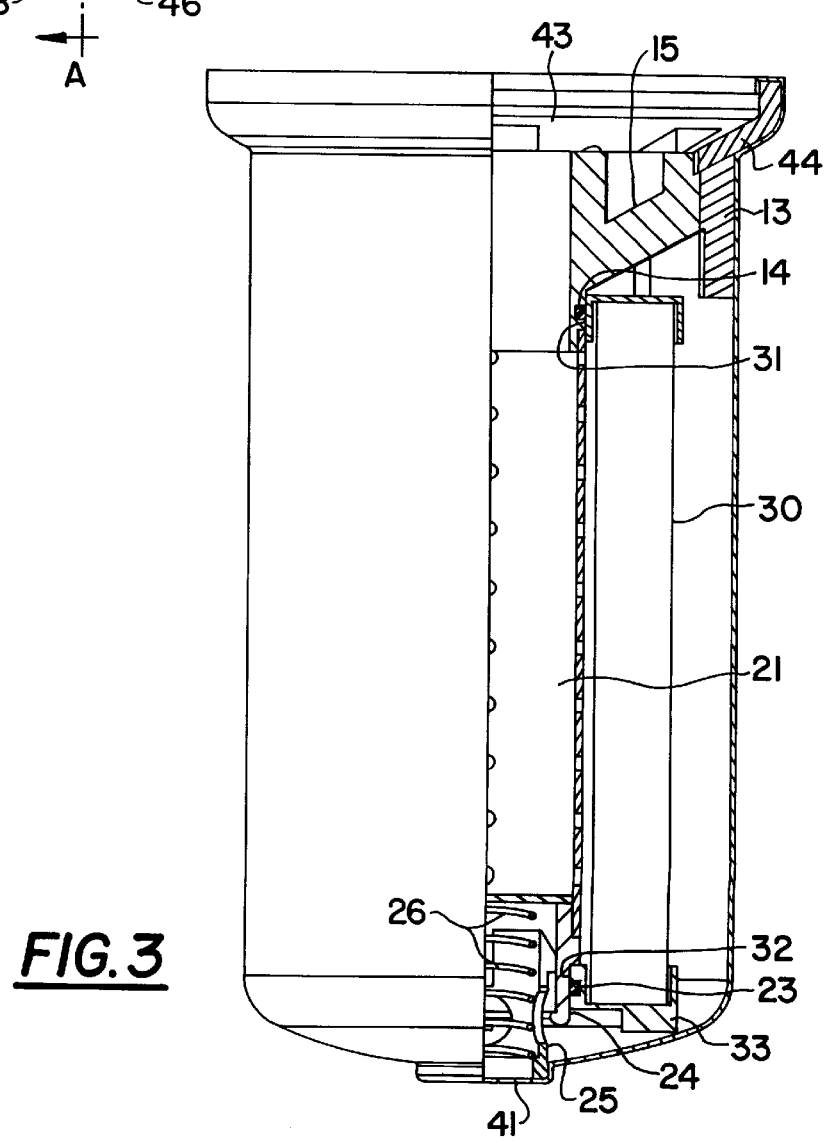
FIG. 3 is a partial cross-sectional view of the assembled filter cartridge from FIG. 2.

Referring now to FIG. 3, the center tube 21 is mounted against the base plate 41 via a spring 26 secured between the concentric tube 25 affixed to the center tube 21. The spring force applied by the spring 26 to the center tube 21 is transferred directly through the protrusions 13 and to the flanges 44. It is important to note that through this construction, the filter cartridge 30 is isolated from the load of the spring 26. Moreover, it should also be clear that through this construction, once the filter assembly is disassembled, the filter element 30 may be easily replaced or cleaned to be reused (depending on the chosen filter media).

It is the permanently sealed top plate 43 of the housing canister 40 that allows the mounting head assembly 10 to connect to the top plate 43 by lining up the attaching plate protrusions 13 with matching top plate cut-outs 45, inserting the mounting head assembly 10, and filter element 30, compressing the internal spring 26, and rotating the inserted assembly within the housing canister 40 until the attaching plate protrusions 13 align with the top plate flanges 44. Once the attaching plate 15 is properly indexed and the indents 46 are properly positioned over the protrusions 13, the spring 26 urges the mounting head assembly 10 to rise and thereby causes the axial ribs 18 to enter the indents 46 to disengageably lock the attaching plate 15 and mounting head assembly 10 into place.

When assembled, fluid or air enters the filter assembly through the apertures 19 defined by the spokes formed in the attaching plate 15, passes through the filter element 30, flows radially inwardly through the center tube's perforations 2, and up through the center tube 21, so as to flow out through the opening 17 in the hexagonal cap 16. It is important to note that by positioning the center tube 21 inwardly of the filter element 30 the material comprising the filter is reinforced and supported against the normal forces being applied by the pressurized fluid flow. This support minimizes the rises associated with pressurized fluid flow such as buckling, collapse or "blow-throw" and broadens the range of materials which can be used for the filter media so as to permit the use of the delicate media used in many micro-filtration applications.

It is also possible to vary this design by using an perforated external cylinder or tube (not shown) which may be positioned outside the filter element 30 so as to cover and surround that element and permit the reverse fluid flow in which fluid enters the filter assembly through the opening 17 and exits the filter assembly through the apertures 19. In this alternate design, the filter element is still isolated from the axial load and the differential pressures across the filter element are accounted for by the existence of an external support.

Removal of the reusable mounting head assembly 10 from the canister is conducted by the reverse of the assembly process. First, the mounting head assembly 10 is pushed in against the internal spring 25 such that the axial ribs 18 clear the indents 46, the attaching plate is then turned until the protrusions 13 line up with the base plate cut outs 45, and finally, the whole assembly, filter 30 and all, is removed from the canister 40. Once the assembly 10 is separated from the canister 40, the filter element 30 may be removed or cleaned for reuse prior to re-assembly. The ability to remove and reuse all of the components aside from a disposable filter element provides substantial savings from manufacturing costs and reduces potentially adverse environmental repercussions associated with disposable filter assemblies.

The filter system disclosed may be manufactured using metals, including corrosion resistant metals, plastics and others sturdy materials. The filter element may be fabricated from a variety of materials, including delicate membranes for the separation of fine particles such as micron and sub-micron sized particles. It should be understood that the present invention is not limited to the preferred embodiment discussed above, which is for illustrative purposes only. Variations may be made to the shapes, number of parts, the arrangement of parts and material of components within the principles of the invention, to the full extent indicated by the broad general meanings of the terms in which the foregoing claims are described.

What is claimed is:

1. A filtration unit comprising:

(a) a housing canister having an open first end and an enclosed second end;

(b) a top plate liquid-tightly attached to said open first end, said top plate having an opening and a plurality of cut-outs formed at spaced intervals around said opening, thereby defining a plurality of flanges, each being disposed between successive adjacent ones of said cut-outs;

(c) a mounting head assembly having a head unit and a center tube, said head unit including an annular base having a center axis and a plurality of fixed protrusions which project generally radially outwardly from said annular base, wherein said projections are spaced in a manner which corresponds to the spacing of said top plate cut-outs;

(i) said head unit further including an attaching plate which is attached to said annular base and defines at least one flow passage; and (ii) said center tube having a circumferential wall, a top end which attaches liquid-tightly to said head unit, and a closed bottom end, said closed bottom end being recessed into said tube from a bottom axial end of said circumferential wall, thereby defining a recess formed into the bottom axial end of said center tube, said center tube having a central flow passage and a plurality of perforations defined through said circumferential wall;

(d) a spring tube assembly comprising a concentric tube having a portion thereof disposed within said recess of said center tube and a portion thereof extending out of said recess and beyond the bottom axial end of said center tube, said concentric tube being axially movable within said recess, and a spring member disposed between said closed bottom end of said center tube and said concentric tube which biases said concentric tube away from said closed bottom end so as to urge an axial end of said concentric tube away from the bottom axial end of said center tube; and (e) a filter element having a top end cap and a bottom end cap, each said end cap having an opening adapted to receive said center tube inserted therethrough;

(i) wherein said mounting head assembly and said top plate are constructed and arranged to (1) permit said annular base protrusions to freely pass through said cut-outs and permit said filter element to pass freely through said opening as said mounting head assembly with said filter element disposed on said center tube is inserted into said open first end of said housing canister, (2) permit continued insertion of said mounting head assembly into said housing canister with the axial end of said concentric tube of said spring tube assembly engaging the enclosed second end of said housing canister so as to compress said concentric tube against a biasing force of said spring member partially into said recess of said center tube until top surfaces of said protrusions are disposed below bottom surfaces of said flanges, and (3) permit said mounting head assembly to be rotated with respect to said top plate until said flanges are disposed in overlapping relation with respect to said protrusions, wherein, upon release of said mounting head assembly, said protrusions are urged against said flanges by the spring force of said spring tube assembly acting axially on said center tube and said head unit to releasably secure said mounting head assembly within said housing canister, and (ii) wherein said filter element is secured within said housing canister with said top end cap engaging said head unit and said bottom end cap engaging the enclosed second end of said housing canister when said mounting head assembly is releasably secured within said housing canister.

2. The filtration unit of claim 1 further including a plurality of first locking components formed about an outer periphery of said annular base, each of said plurality of first locking components being formed adjacent an associated one of said plurality of fixed protrusions, and a plurality of second locking components complementary to said plurality of first locking components, each of said plurality of second locking components being formed on an associated one of said plurality of flanges, whereby upon rotation of said head unit about said center axis, said first and second locking components can be engaged so that said head unit is properly indexed with respect to and secured to said housing canister.

3. The filtration unit of claim 2, wherein each of said plurality of first locking components comprises an axial rib projecting radially outwardly from said annular base relative to said center axis and each of said plurality of second locking components comprises an axial slot.

4. The filtration unit of claim 1 further comprising an O-ring between said filter element top end cap and said head unit annular base and an O-ring disposed between said center tube and said filter element bottom end cap.

5. The filtration unit of claim 1 wherein said filter element bottom end cap includes at least one finger for cooperating with said second end of said housing canister for holding said filter element in place in said housing canister.

6. The filtration unit of claim 1 wherein said head unit assembly includes a socket assembly surrounding said central flow passage which socket assembly is adapted to fit a tool to facilitate disengagement of said head unit from said housing canister top plate.

7. The filtration unit of claim 1 wherein said housing canister is of a cylindrical construction.

8. The filtration unit of claim 7 wherein the enclosed second end of said cylindrical housing canister is constructed so as to include an internally recessed base plate.

9. The filtration unit of claim 8 wherein said spring tube assembly is engaged with said housing canister at the internally recessed base plate and the spring member includes a coil spring.

10. A spin-on filter element for filtering liquids, which may be readily disassembled, comprising:

a perforated center tube support which is liquid-tightly connected at one end to a mounting head assembly and is closed at an other end thereof;

a housing canister having an open first end and a closed second end;

a tubular filter element adapted to fit within the housing canister and adapted to slip over the perforated center tube support in close proximity thereto but free from physical retention means between the tubular filter element and the center-tube support;

means for forming a releasable seal between the tubular filter element and the center-tube support;

the mounting head assembly including an annular base having a threaded fitting for attachment to a fluid supply, whereby unfiltered fluid can flow into the housing canister and filtered fluid can flow out of the housing canister, the mounting head assembly further including a bayonet connection structure for releasable engagement with the first end of the housing canister; and a spring tube assembly for urging the mounting head assembly bayonet connection structure into engagement with the first end of the housing canister after rotation of the mounting head assembly about a center axis thereof relative to the housing canister, said spring tube assembly being coupled with said center tube adjacent said closed end thereof and comprising a movable tube arranged coaxially with respect to said center tube that is constructed and arranged to be axially movable between an extended position and a retracted position with respect to said center tube and a spring operatively positioned between said center tube and said movable tube for urging said movable tube toward said extended position, wherein the bayonet connection structure comprises a plurality of equally spaced generally radially outwardly directed protrusions and a corresponding number of complementary recesses to receive the protrusions.

11. The spin-on filter element of claim 10 wherein said spring includes a coil spring.

12. The spin-on filter element of claim 11 wherein the coil spring in mounted to the closed end of the center tube support.

13. The spin-on filter element of claim 11 wherein the mounting head assembly includes a socket assembly adapted to fit a tool to facilitate disengagement of the mounting head assembly from the housing canister.

14. The spin-on filter element of claim 10 wherein the housing canister is of a cylindrical construction and the closed second end is an internally recessed base plate with which the spring tube assembly is engaged.

15. The filtration unit of claim 10, wherein said bayonet connecting structure further includes, adjacent each said protrusion, a first locking component formed on an outer periphery of said annular base, and a second locking component between adjacent pairs of complementary recesses complementary to said first locking component, whereby upon rotation of said head unit about said center axis, said first and second locking components can be engaged so that said head unit is properly indexed with respect to and secured to said housing canister.

16. The filtration unit of claim 15, wherein each said first locking component comprises an axial rib projecting radially outwardly from said annular base relative to said center axis and each said second locking component comprises an axial slot.

17. A spin-on filter unit for filtering liquids, which may be readily disassembled, comprising:

a perforated support cylinder which is liquid-tightly connected at one end to a mounting head assembly and is closed at an other end thereof;

a housing canister having a first open end and a closed second end;

a tubular filter element adapted to fit between the housing canister and the perforated support cylinder in close proximity thereto but free from physical retention means between the tubular filter element and the support cylinder;

means for forming a releasable seal between the tubular filter element and the support cylinder, the mounting head assembly further including an annular base provided with a threaded fitting for attachment to a fluid supply, whereby unfiltered fluid can flow into the housing canister and filtered fluid can flow out of the housing canister, the mounting head assembly further including a bayonet connection means for releasable engagement with the open end of the housing canister; and a spring tube assembly for urging the mounting head assembly bayonet connection means into engagement with the first end of the housing canister after rotation of the mounting head assembly about its center axis relative to the housing canister, said spring tube assembly coupled with said support cylinder adjacent said closed end thereof and comprising a movable tube arranged coaxially with respect to said support cylinder that is constructed and arranged to be axially movable between an extended position and a retracted position with respect to said support cylinder and a spring operatively positioned between said support cylinder and said movable tube for urging said movable tube toward said extended position, wherein the bayonet connection means comprises a plurality of equally spaced generally radially outwardly directed protrusions and a corresponding number of complementary recesses to receive the protrusions.

18. The spin-on filter unit of claim 17 wherein the means for forming a releasable seal between the tubular filter element and the support cylinder comprises an O-ring disposed between a bottom end cap of the tubular filter element and the support cylinder and an O-ring disposed between a top end cap of the tubular filter element and the perforated support cylinder.

19. The filtration unit of claim 17, wherein said bayonet connecting means further includes, adjacent each said protrusion, a first locking component formed on an outer periphery of said annular base, and between adjacent pairs of complementary recesses a second locking component complementary to said first locking component, whereby upon rotation of said head unit about said center axis, said first and second locking components can be engaged so that said head unit is properly indexed with respect to and secured to said housing canister.

20. The filtration unit of claim 19, wherein each said first locking component comprises an axial rib projecting radially outwardly from said annular base relative to said center axis and each said second locking component comprises an axial slot.

* * * * *